(12) United States Patent
Asakawa et al.

(10) Patent No.: US 10,801,405 B2
(45) Date of Patent: Oct. 13, 2020

(54) VARIABLE DISPLACEMENT TURBOCHARGER

(71) Applicant: IHI Corporation, Koto-ku (JP)

(72) Inventors: Takao Asakawa, Tokyo (JP); Kenichi Segawa, Tokyo (JP); Takahiro Kobayashi, Tokyo (JP); Ryota Sakisaka, Tokyo (JP); Kazuko Takeuchi, Tokyo (JP); Kenji Bunno, Tokyo (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/242,035

(22) Filed: Jan. 8, 2019

(65) Prior Publication Data

US 2019/0153943 A1  May 23, 2019

Related U.S. Application Data

(63) Continuation of application No. PCT/JP2017/026658, filed on Jul. 24, 2017.

(30) Foreign Application Priority Data

Aug. 24, 2016  (JP) ................. 2016-163301

(51) Int. Cl.
  *F02C 6/12* (2006.01)
  *F01D 17/16* (2006.01)
  *F02B 37/24* (2006.01)

(52) U.S. Cl.
  CPC ............. *F02C 6/12* (2013.01); *F01D 17/16* (2013.01); *F02B 37/24* (2013.01);
  (Continued)

(58) Field of Classification Search
  CPC . F02C 6/12; F02B 37/24; F01D 17/16; Y02T 10/144; F05D 2240/50; F05D 2220/40
  (Continued)

(56) References Cited

U.S. PATENT DOCUMENTS

2002/0187061 A1  12/2002 Arnold
2005/0011192 A1  1/2005 Ohishi
(Continued)

FOREIGN PATENT DOCUMENTS

CN    1969109 A    5/2007
CN    102149913 A    8/2011
(Continued)

OTHER PUBLICATIONS

Japanese Office Action dated Jan. 28, 2020, in Patent Application No. 2019-221950, 3 pages.
(Continued)

*Primary Examiner* — Hoang M Nguyen
(74) *Attorney, Agent, or Firm* — Oblon, McClelland, Maier & Neustadt, L.L.P.

(57) ABSTRACT

Provided is a variable capacity turbocharger, including: a drive ring including a main body portion having an annular shape; a first projection portion and a second projection portion, which are formed on the main body portion, and are arranged apart from one another in a circumferential direction of the main body portion so as to sandwich a link plate to which a nozzle vane is mounted; and a cutout portion, which is formed in a portion of the main body portion between the first projection portion and the second projection portion.

8 Claims, 11 Drawing Sheets

(52) U.S. Cl.
CPC ...... *F05D 2220/40* (2013.01); *F05D 2240/50* (2013.01); *Y02T 10/144* (2013.01)

(58) Field of Classification Search
USPC .......................... 60/605.1–612; 417/406–409
See application file for complete search history.

(56) References Cited

U.S. PATENT DOCUMENTS

| | | | | |
|---|---|---|---|---|
| 2011/0274542 | A1* | 11/2011 | Inoshita | .................. F01D 9/026 415/213.1 |
| 2011/0283698 | A1* | 11/2011 | Sausse | .................. F01D 17/165 60/605.1 |
| 2015/0118029 | A1 | 4/2015 | Radke et al. | |
| 2015/0132113 | A1 | 5/2015 | Jaenike | |
| 2016/0003138 | A1* | 1/2016 | Iizuka | ..................... F02B 37/24 415/148 |
| 2018/0355752 | A1* | 12/2018 | Shioya | ..................... F02B 37/24 |
| 2018/0355889 | A1* | 12/2018 | Asakawa | ................. F02B 37/24 |

FOREIGN PATENT DOCUMENTS

| | | |
|---|---|---|
| CN | 103649492 A | 3/2014 |
| CN | 104220720 A | 12/2014 |
| CN | 104508255 A | 4/2015 |
| DE | 10 2012 106 789 A1 | 1/2014 |
| JP | 2002-47941 A | 2/2002 |
| JP | 2002-47943 A | 2/2002 |
| JP | 2002-332856 | 11/2002 |
| JP | 2003-254075 | 9/2003 |
| JP | 2007-40251 A | 2/2007 |
| JP | 2010-156279 | 7/2010 |
| JP | 2010-216281 | 9/2010 |
| JP | 2012-140894 | 7/2012 |
| JP | 2015-518543 | 7/2015 |
| JP | 2015-526633 | 9/2015 |
| KR | 10-2015-0003833 | 1/2015 |
| WO | WO 2011/068267 A1 | 6/2011 |
| WO | WO 2013/163023 A1 | 10/2013 |
| WO | WO 2014/015958 A1 | 1/2014 |

OTHER PUBLICATIONS

International Search Report dated Sep. 12, 2017 in PCT/JP2017/026658 filed Jul. 24, 2017 (with English Translation).
Written Opinion dated Sep. 12, 2017 in PCT/JP2017/026658 filed Jul. 24, 2017.
Combined Chinese Office Action and Search Report dated Jun. 2, 2020 in corresponding Chinese Patent Application No. 201780043447.9 (with English Translation and English Translation of Category of Cited Documents) citing documents AA, AO-AQ therein, 12 pages.

* cited by examiner

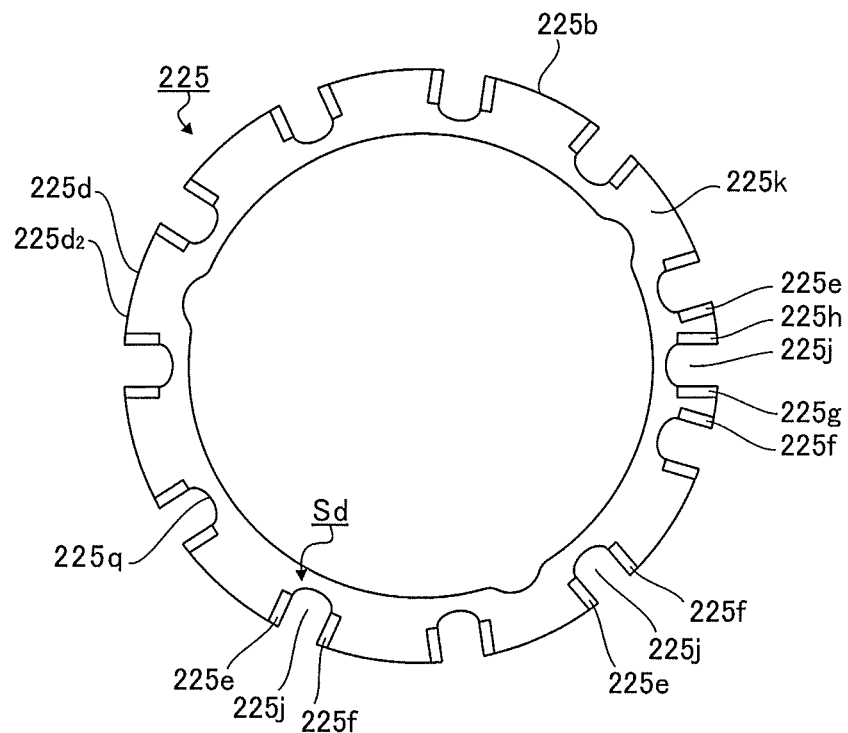
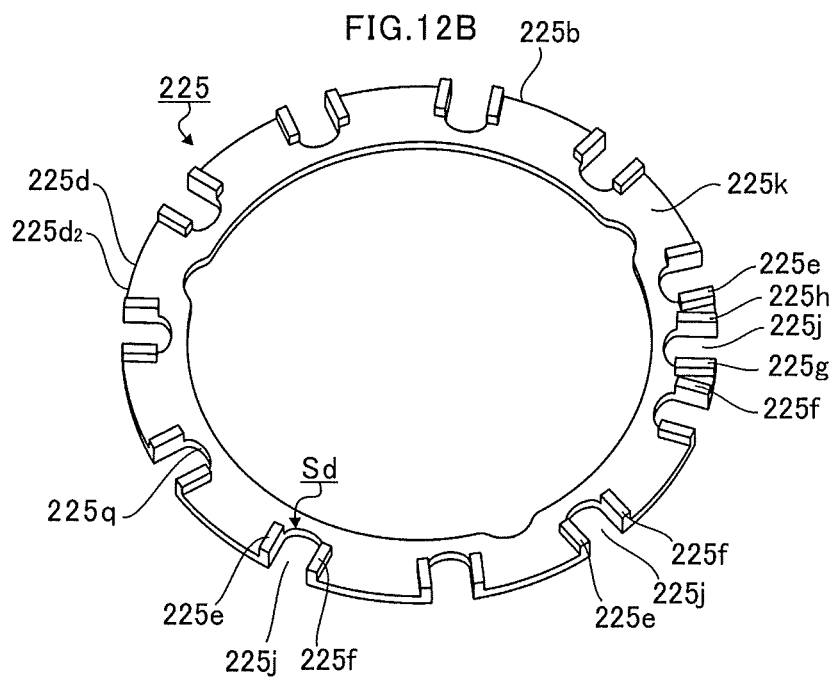

VARIABLE DISPLACEMENT TURBOCHARGER

CROSS REFERENCE TO RELATED APPLICATIONS

This application is a continuation application of International Application No. PCT/JP2017/026658, filed on Jul. 24, 2017, which claims priority to Japanese Patent Application No. 2016-163301, filed on Aug. 24, 2016, the entire contents of which are incorporated by reference herein.

BACKGROUND ART

Technical Field

The present disclosure relates to a variable capacity turbocharger including link plates to which nozzle vanes are mounted.

Related Art

Hitherto, a turbocharger of a variable capacity type has been widely used. In such a turbocharger, a plurality of nozzle vanes are annularly arrayed in a flow passage for introducing exhaust gas from a turbine scroll flow passage to a turbine impeller. When shaft portions of the nozzle vanes are rotated by power of an actuator, angles of the nozzle vanes are changed in the flow passage along with the rotation of the shaft portions. Through the change in angle of the nozzle vanes, a flow passage width (so-called nozzle throat width) is changed, and a flow rate of the exhaust gas flowing through the flow passage is controlled.

Specifically, the shaft portions of the nozzle vanes are axially supported by shaft holes formed in a nozzle ring. Link plates are mounted to end portions of the shaft portions projecting from the nozzle ring. A drive ring includes a main body portion having an annular shape. The main body portion of the drive ring is fitted to a cylindrical portion projecting from a main body portion of the nozzle ring in the axial direction. Moreover, for example, in a turbocharger described in Patent Literature 1, first projection portions and second projection portions are formed on the main body portion of the drive ring. The first projection portions and the second projection portions project from the main body portion toward the link plate side. The first projection portion and the second projection portion are arranged apart from one another in a circumferential direction, and are faced to one another so as to sandwich the link plate. When the drive ring is rotated by the power of the actuator, the link plates are pressed by the projecting portions of the drive ring. The link plates are swung, and the shaft portions and the nozzle vanes are thus rotated.

CITATION LIST

Patent Literature

Patent Literature 1: WO 2011/068267 A1

SUMMARY

Technical Problem

As described before, in the related-art nozzle drive mechanism, the drive ring rotates at the time of operation. The projecting portions press the link plates. When the projecting portions press the link plates, excessive stress concentration may occur at base end portions of the projecting portions.

Therefore, it is an object of the present disclosure to provide a variable capacity turbocharger which is capable of alleviate stress concentration.

Solution to Problem

In order to achieve the above-mentioned object, according to one embodiment of the present disclosure, there is provided a variable capacity turbocharger, including: a drive ring including a main body portion having an annular shape; a first projection portion and a second projection portion, which are formed on the main body portion, and are arranged apart from one another in a circumferential direction of the main body portion so as to sandwich a link plate to which a nozzle vane is mounted; and a cutout portion, which is formed in a portion of the main body portion between the first projection portion and the second projection portion.

The variable capacity turbocharger may further include a nozzle ring, which has a shaft hole configured to axially support a shaft portion connecting the nozzle vane and the link plate to one another, and is configured to support the main body portion of the drive ring.

The first projection portion and the second projection portion may project radially outward from an outer peripheral surface of the drive ring, and bend toward a center axis direction of the drive ring.

A first outer peripheral surface of the outer peripheral surface of the drive ring positioned between the first projection portion and the second projection portion may be positioned on a radially inner side with respect to a second outer peripheral surface positioned outside the first projection portion and the second projection portion.

The variable capacity turbocharger may further include a first connection portion, which includes a curved surface connecting a base end portion of each of the first projection portion and the second projection portion and the first outer peripheral surface to one another.

The variable capacity turbocharger may further include a second connection portion, which includes a curved surface connecting the base end portion and the second outer peripheral surface to one another.

Effects of Disclosure

According to the present disclosure, the stress concentration can be alleviated.

BRIEF DESCRIPTION OF DRAWINGS

FIG. 12A is a front view of a drive ring of a second modification example, and FIG. 12B is a perspective view of the drive ring of the second modification example.

DESCRIPTION OF EMBODIMENT

Figure 1:
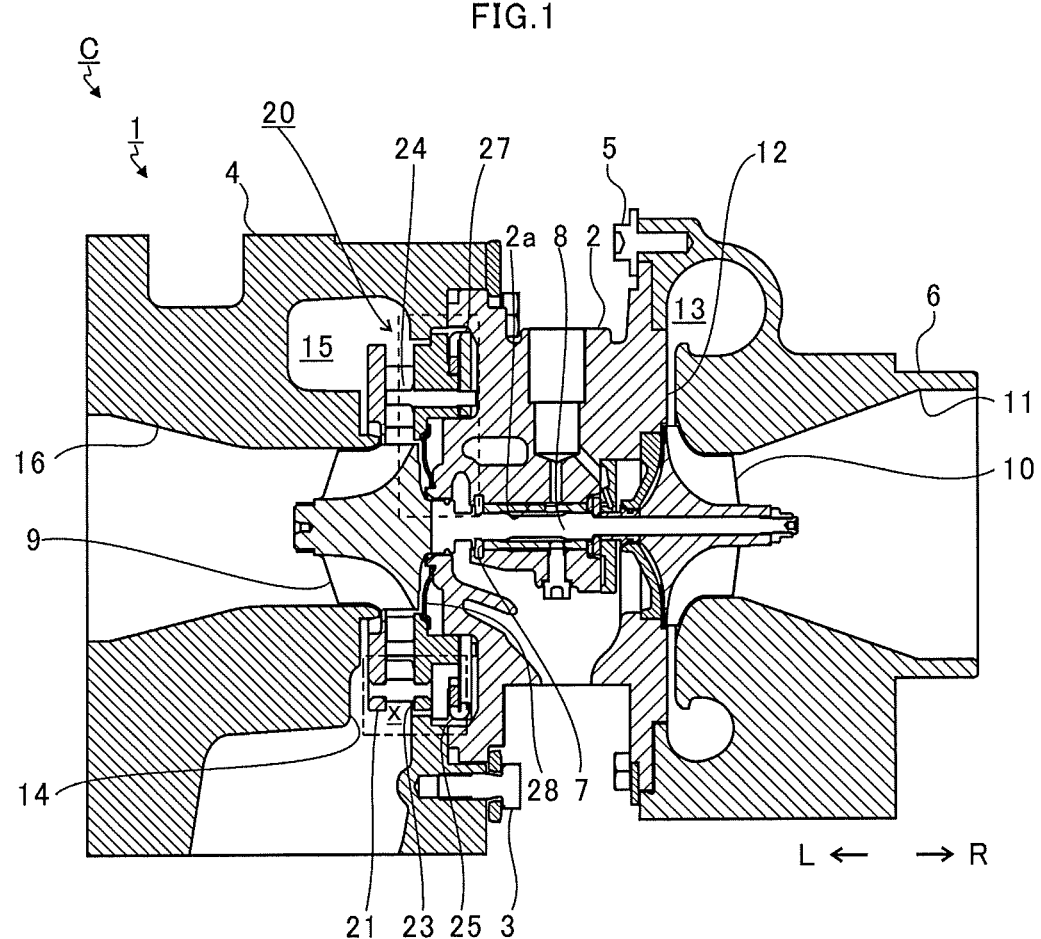
FIG. 1 is a schematic sectional view of a variable capacity turbocharger.

Now, with reference to the attached drawings, one embodiment of the present disclosure is described in detail. The dimensions, materials, and other specific numerical values represented in the embodiment are merely examples used for facilitating understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a variable capacity turbocharger C. In the following description, the direction indicated by the arrow L illustrated in FIG. 1 corresponds to a left side of the variable capacity turbocharger C. The direction indicated by the arrow R illustrated in FIG. 1 corresponds to a right side of the variable capacity turbocharger C. As illustrated in FIG. 1, the variable capacity turbocharger C includes a turbocharger main body 1. The turbocharger main body 1 includes a bearing housing 2, a turbine housing 4, and a compressor housing 6. The turbine housing 4 is coupled to a left side of the bearing housing 2 by fastening bolts 3. The compressor housing 6 is coupled to a right side of the bearing housing 2 by fastening bolts 5.

The bearing housing 2 has a receiving hole 2a. The receiving hole 2a penetrates through the bearing housing in a right-and-left direction of the variable capacity turbocharger C. A shaft 8 is axially supported so as to be rotatable by a radial bearing 7 (in this embodiment, a semi-floating bearing is illustrated in FIG. 1 as an example) received in the receiving hole 2a. A turbine impeller 9 is mounted (fastened) to a left end portion of the shaft 8. The turbine impeller 9 is received in the turbine housing 4 so as to be rotatable. Further, a compressor impeller 10 is mounted (fastened) to a right end portion of the shaft 8. The compressor impeller 10 is received in the compressor housing 6 so as to be rotatable.

The compressor housing 6 has a suction port 11. The suction port 11 is opened on the right side of the variable capacity turbocharger C. The suction port 11 is connected to an air cleaner (not shown). A diffuser flow passage 12 configured to increase a pressure of air is formed by facing surfaces of the bearing housing 2 and the compressor housing 6. The diffuser flow passage 12 is annularly formed so as to extend from an inner side toward an outer side in a radial direction of the shaft 8. The diffuser flow passage 12 communicates with the suction port 11 on the inner side in the radial direction through intermediation of the compressor impeller 10.

Further, the compressor housing 6 has a compressor scroll flow passage 13. The compressor scroll flow passage 13 has an annular shape. For example, the compressor scroll flow passage 13 is positioned on the outer side in the radial direction of the shaft 8 with respect to the diffuser flow passage 12. The compressor scroll flow passage 13 communicates with a suction port of an engine (not shown). The compressor scroll flow passage 13 communicates also with the diffuser flow passage 12. When the compressor impeller 10 is rotated, air is sucked into the compressor housing 6 through the suction port 11. The sucked air having been sucked through the suction port 11 is accelerated and pressurized during a course of flowing through blades of the compressor impeller 10. The air having been accelerated and pressurized is increased in pressure (pressure recovery) in the diffuser flow passage 12 and the compressor scroll flow passage 13, and is introduced to the engine.

Further, a clearance 14 is formed between facing surfaces of the bearing housing 2 and the turbine housing 4. The clearance 14 is a space which defines a flow passage "x" allowing nozzle vanes 24, which are described later, to be arranged therein and allowing exhaust gas to flow therethrough. The clearance 14 is annularly formed so as to extend from an inner side toward an outer side in the radial direction of the shaft 8 (turbine impeller 9).

Moreover, a discharge port 16 is formed in the turbine housing 4. The discharge port 16 faces a front side of the turbine impeller 9. The discharge port 16 communicates with the turbine scroll flow passage 15 through intermediation of the turbine impeller 9. The discharge port 16 is connected to an exhaust gas purification device (not shown).

The turbine scroll flow passage 15 communicates with a gas inflow port (not shown). Exhaust gas discharged from the engine is introduced to the gas inflow port. The turbine scroll flow passage 15 communicates also with the flow passage "x". Thus, the exhaust gas introduced through the gas inflow port to the turbine scroll flow passage 15 flows through the flow passage "x". The exhaust gas having flowed through the flow passage "x" is introduced to the discharge port 16 through intermediation of the turbine impeller 9. That is, the flow passage "x" is a passage extending from the turbine scroll flow passage 15 to the turbine impeller 9. The exhaust gas causes the turbine impeller 9 to rotate during the course of flowing from the flow passage "x" to the discharge port 16. A rotational force of the turbine impeller 9 is transmitted to the compressor impeller 10 through intermediation of the shaft 8. By the rotational force of the compressor impeller 10, the air is increased in pressure and is introduced to the suction port of the engine.

At this time, when the flow rate of the exhaust gas introduced to the turbine housing 4 changes, the rotation amounts of the turbine impeller 9 and the compressor impeller 10 change. In some cases, depending on an operating condition of the engine, the air increased in pressure to a desired pressure cannot sufficiently be introduced to the suction port of the engine. Thus, a nozzle drive mechanism 20 is provided in the variable capacity turbocharger C.

The nozzle drive mechanism 20 changes a flow passage width (nozzle throat width described later) of the flow passage "x" of the turbine housing 4. The nozzle drive mechanism 20 changes the flow speed of the exhaust gas introduced to the turbine impeller 9 in accordance with a flow rate of the exhaust gas. Specifically, when the rotation speed of the engine is low, and the flow rate of the exhaust gas is small, the nozzle drive mechanism 20 reduces an opening degree of the nozzle of the flow passage "x". In such a manner, the flow speed of the exhaust gas introduced to the turbine impeller 9 increases. The turbine impeller 9 is rotatable with even a small flow rate. Now, description is made of a configuration of the nozzle drive mechanism 20.

Figure 2:
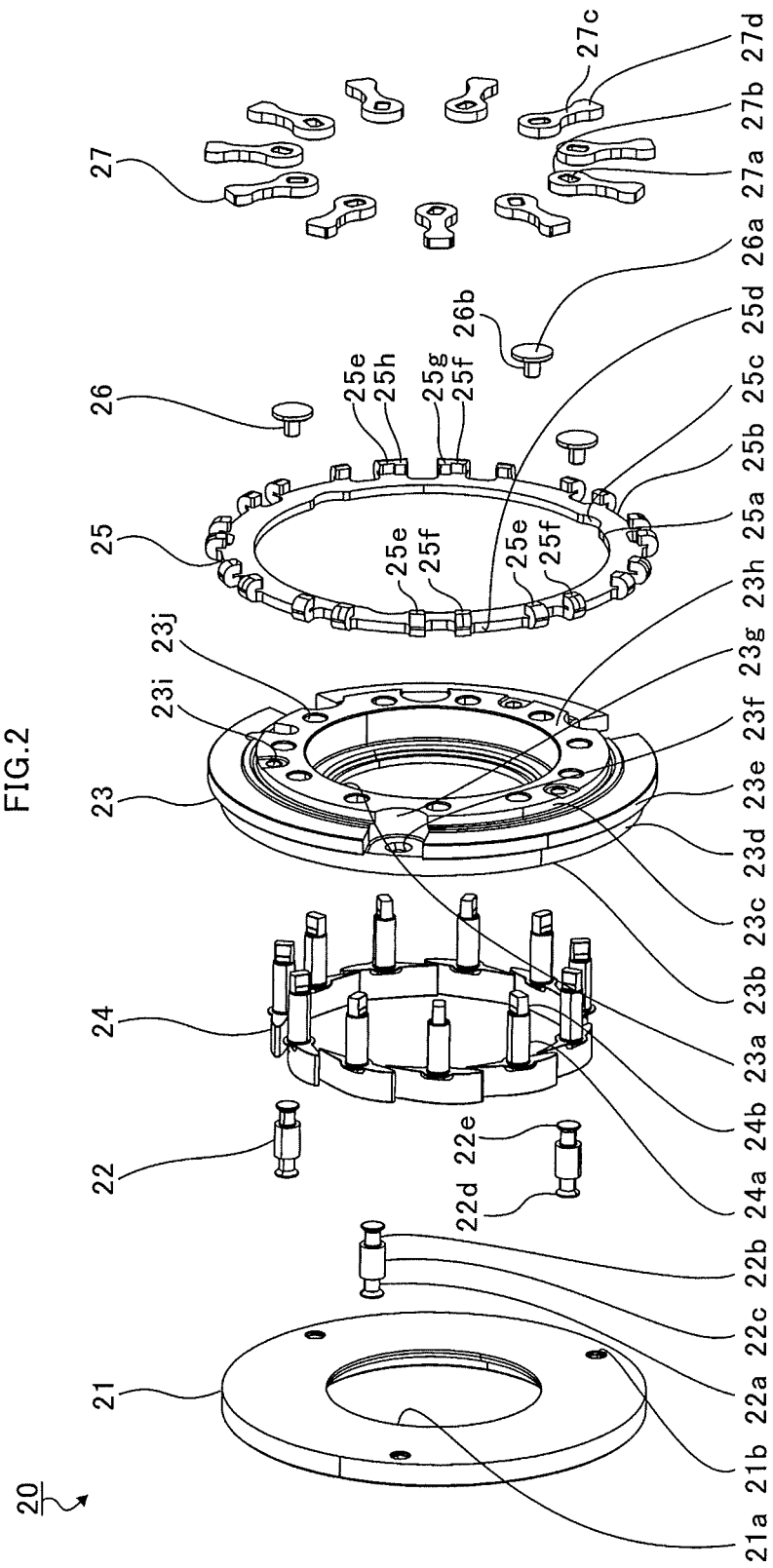
FIG. 2 is an exploded perspective view of a nozzle drive mechanism.

FIG. 2 is an exploded perspective view of the nozzle drive mechanism 20. As illustrated in FIG. 2, the nozzle drive mechanism 20 includes a plate 21. The plate 21 has a plate hole 21a. The plate hole 21a penetrates through the plate 21 in an axial direction of the shaft 8 (hereinafter referred to as "axial direction"). The plate 21 has, for example, a flat plate shape having a circular cross-sectional shape in a direction orthogonal to the axial direction of the shaft 8.

On an outer peripheral surface side of the plate 21, there are formed plate pin holes 21b. The plate pin holes 21b penetrate through the plate 21 in the axial direction. A plurality of (three in the example of FIG. 2) plate pin holes 21b are formed apart from each other in a circumferential direction of the plate 21. One ends of pins 22 are inserted through the plate pin holes 21b, respectively.

The nozzle ring 23 is positioned on a compressor impeller 10 side (right side in FIG. 1) with respect to the plate 21. The nozzle ring 23 includes a main body 23b. The main body 23b has an annular shape. A ring hole 23a is formed in the main body 23b. The ring hole 23a passes through the main body 23b in the axial direction. A cylindrical portion 23c is formed on a portion of the main body 23b on a side opposite to the plate 21. The cylindrical portion 23c projects from the main body 23b to a side apart from the plate 21.

A projecting portion 23e is formed on an outer peripheral surface 23d of the main body 23b. The projecting portion 23e extends in a circumferential direction of the main body 23b. The projecting portion 23e projects to the radially outer side with respect to the main body 23b (cylindrical portion 23c). Ring pin holes 23f are formed in portions of the main body 23b faced to the plate pin holes 21b of the plate 21. The ring pin holes 23f pass through the main body 23b in the axial direction. Counter bore grooves 23g are formed in the main body 23b on a cylindrical portion 23c side. The ring pin holes 23f are opened in the counter bore grooves 23g. The pins 22 are inserted into the ring pin holes 23f.

A large-diameter portion 22c is formed between both end portions 22a and 22b in the pin 22. An outer diameter of the large-diameter portion 22c is larger than outer diameters of the both end portions 22a and 22b. The end portions 22a of the pins 22 are inserted into the plate pin holes 21b. The large-diameter portion 22c is held in abutment against a surface of the plate 21 faced to the nozzle ring 23. In such a manner, insertion positions of the pins 22 with respect to the plate pin holes 21b are determined. Similarly, end portions 22b of the pins 22 are inserted into the ring pin holes 23f. The large-diameter portion 22c is held in abutment against a surface of the nozzle ring 23 faced to the plate 21. In such a manner, insertion positions of the pins 22 with respect to the ring pin holes 23f are determined. On this occasion, large-diameter portions 22d and 22e are illustrated at ends on further outer sides of the both end portions 22a and 22b of the pin 22. As an example, when the pins 22 are assembled to the plate 21 or the nozzle ring 23 through caulking, the shapes of the pins 22 after the caulking are illustrated. The shape of the pin 22 before the insertion into the plate pin hole 21b of the plate 21 or the ring pin hole 23f of the nozzle ring 23 is, for example, such that pin portions having the same radii as those of the both end portions 22a and 22b of the pin 22 are formed so as to extend to the most end portions.

In such a manner, a facing clearance between the plate 21 and the nozzle ring 23 is defined by the pins 22. The flow passage "x" is formed as the clearance across which the plate 21 and the nozzle ring 23 are faced to one another. That is, an axial length of the flow passage "x" is defined by the pins 22.

Guide holes 23i are opened on an axial end surface 23h (on the side opposite to the plate 21) in the cylindrical portion 23c of the nozzle ring 23. A plurality of (three in the example of FIG. 2) guide holes 23i are formed apart in the circumferential direction in the cylindrical portion 23c. Moreover, shaft holes 23j are formed in the nozzle ring 23. The shaft holes 23j pass through the main body 23b and the cylindrical portion 23c in the axial direction. A plurality of (eleven in the example of FIG. 2) shaft holes 23j are formed apart in the circumferential direction of the main body 23b.

The nozzle vanes 24 are positioned in the clearance (namely, the flow passage "x") between the plate 21 and the nozzle ring 23. In other words, the plate 21 is faced to the nozzle ring 23 on a nozzle vane 24 side. A plurality (eleven in the example of FIG. 2) of nozzle vanes 24 are provided apart in the circumferential direction (the rotation direction of the turbine impeller 9) of the main body 23b similarly to the shaft holes 23j.

A shaft portion 24a is formed on the nozzle vane 24. The shaft portion 24a projects to a nozzle ring 23 side.

The shaft portion 24a is inserted into the shaft hole 23j so as to be axially supported (in a cantilever state). In the foregoing, description is made of the case in which the shaft portions 24a are axially supported by the nozzle ring 23. However, the shaft portions 24a may also extend toward the plate 21 side, and holes configured to axially support the shaft portions 24a may be formed in the plate 21.

The drive ring 25 includes a main body portion 25b having an annular shape. A drive hole 25a is formed in the main body portion 25b. The drive hole 25a passes through the main body portion 25b in the axial direction. An inner diameter of the drive hole 25a is slightly larger than an outer diameter of the cylindrical portion 23c of the nozzle ring 23. The cylindrical portion 23c is fitted (inserted) to the drive hole 25a of the drive ring 25. In such a manner, the drive ring 25 is supported by the outer peripheral surface 23d of the cylindrical portion 23c so as to be rotatable.

A guide pin 26 includes a head portion 26a and a small-diameter portion 26b. The small-diameter portion 26b has an outer diameter smaller than that of the head portion 26a. The small-diameter portion 26b is, for example, press-fitted to the guide hole 23i, and is held.

Figure 3:
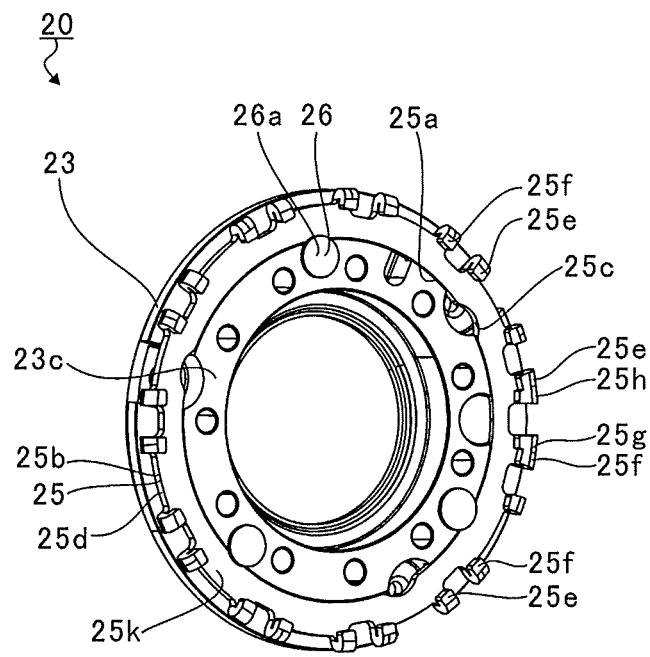
FIG. 3 is an explanatory view for illustrating a structure for restricting movement of a drive ring through use of guide pins.

FIG. 3 is an explanatory view for illustrating a structure for restricting movement of the drive ring 25 through use of the guide pins 26. In FIG. 3, the nozzle ring 23, the drive ring 25, and the guide pins 26 of the nozzle drive mechanism 20 are extracted and illustrated.

As illustrated in FIG. 3, the cylindrical portion 23c of the nozzle ring 23 is arranged inside (inner peripheral side) the drive hole 25a of the drive ring 25. The guide holes 23i (see FIG. 2) are positioned on a radially inner side of the drive ring 25. The small-diameter portions 26b (see FIG. 2) of the guide pins 26 are press-fitted to the guide holes 23i. The head portions 26a of the guide pins 26 slightly extend to the radially outer side with respect to the drive holes 25*a* of the drive ring 25. An axial movement of the drive ring 25 is restricted with a part of the head portion 26*a* being faced to (held in abutment against) the drive ring 25 in the axial direction.

Moreover, inner peripheral grooves 25*c* are formed in an inner peripheral surface of the drive hole 25*a*. The inner peripheral grooves 25*c* are recessed to the radially outer side. The inner peripheral grooves 25*c* as many as the guide pins 26 are formed apart in the peripheral direction. For example, the nozzle ring 23 and the drive ring 25 are rotated relative to one another so that a rotation phase of one of the inner peripheral grooves 25*c* matches the head portion 26*a* of the guide pin 26. On this occasion, other inner peripheral grooves 25*c* respectively match other guide pins 26 in rotation phase. The inner peripheral grooves 25*c* are recessed to the radially outer side more than the head portions 26*a*. In other words, the head portion 26*a* of the guide pin 26 can pass through the inside of the inner peripheral groove 25*c* in the axial direction. Therefore, the drive ring 25 can be mounted to and removed from the nozzle ring 23 in a state in which the rotation phases of the guide pins 26 and the inner peripheral grooves 25*c* are matching one another.

For example, the guide pins 26 are press-fitted to the guide holes 23*i* before the drive ring 25 is assembled to the nozzle ring 23. At this time, the inner peripheral grooves 25*c* of the drive ring 25 are brought to be faced to the head portions 26*a* of the guide pins 26. In such a manner, the drive ring 25 can be assembled to the nozzle ring 23. The guide pins 26 can be press-fitted to the guide holes 23*i* before the pins 22 and the like are assembled to the nozzle ring 23. As a result, deformations of the pins 22 and the like caused by the press-fitting of the guide pins 26 are avoided. Control of a press-fitting load is not required. Specifically, ease of the operation increases compared with a case in which the press-fitting load is managed in such a manner that the guide pins 26 are press-fitted until the guide pins 26 come in abutment against bottom surfaces of the guide holes 23*i* or the like.

Moreover, for example, first projection portions 25*e*, second projection portions 25*f*, one third projection portion 25*g*, and one fourth projection portion 25*h* are formed on the main body portion 25*b* of the drive ring 25. The first projection portions 25*e*, the second projection portions 25*f*, the third projection portion 25*g*, and the fourth projection portion 25*h* project radially outward from the outer peripheral surface 25*d*. The first projection portions 25*e*, the second projection portions 25*f*, the third projection portion 25*g*, and the fourth projection portion 25*h* project in the axial direction toward a side opposite to the nozzle ring 23 (link plate 27 side described later).

A plurality of (as many as the number of the nozzle vanes 24, which is eleven in the example of FIG. 3) pairs of the first projection portion 25*e* and the second projection portion 25*f* are formed, for example, at equal intervals in the circumferential direction of the main body portion 25*b*. A separation interval between the first projection portion 25*e* and the second projection portion 25*f* in each of the pairs is slightly larger than a width of a distal end portion 27*d* of the nozzle vane 24 corresponding and described later. Moreover, for example, the separation intervals of the respective pairs of the first projection portion 25*e* and the second projection portion 25*f* may approximately be the same. Moreover, a separation interval between the first projection portion 25*e* and the second projection portion 25*f* out of neighboring pairs may be larger than the separation interval of each of the pairs of the first projection portion 25*e* and the second projection portion 25*f*.

The main body portion 25*b* has one third projection portion 25*g* and one fourth projection portion 25*g*. The third projection portion 25*g* and the fourth projection portion 25*h* are arranged between a pair of the first projection portion 25*e* and the second projection portion 25*f* and a neighboring pair of the first projection portion 25*e* and the second projection portion 25*f*.

Referring back to FIG. 2, the shaft portion 24*a* is longer in axial length than the shaft hole 23*j*. A distal end portion 24*b* of the shaft portion 24*a* projects from the shaft hole 23*j* to a side opposite to the nozzle vanes 24. The distal end portions 24*b* of the shaft portions 24*a* projecting from the shaft holes 23*j* of the nozzle ring 23 are inserted into the drive holes 25*a* of the drive ring 25, and are then inserted into the link plates 27.

The link plates 27 are provided as many as the nozzle vanes 24 on a side opposite to the nozzle vanes 24 with respect to the nozzle ring 23. The link plate 27 includes a mounting portion 27*b*. A plate hole 27*a* is formed in the mounting portion 27*b*. The distal end portion 24*b* of the shaft portion 24*a* is inserted into the plate hole 27*a*. The shaft portions 24*a* are inserted into the plate holes 27*a*, and are mounted to the mounting portions 27*b*. The link plates 27 rotate together along with rotation of the shaft portions 24*a*.

An extension portion 27*c* is formed on the mounting portion 27*b*. The extension portions 27*c* extend to the radially outer side of the nozzle ring 23. A distal end portion 27*d* of the extension portion 27*c* on a side opposite to the mounting portion 27*b* is arranged between a pair of the first projection portion 25*e* and the second projection portion 25*f*. That is, the distal end portion 27*d* of the link plate 27 is faced to the first projection portion 25*e* and the second projection portion 25*f* in the circumferential direction of the main body portion 25*b*. In other words, the first projection portion 25*e* and the second projection portion 25*f* are arranged apart from one another in the circumferential direction of the main body portion 25*b* of the drive ring 25, and are faced to one another so as sandwich the link plate 27. In this state, a distance between the one pair of the first projection portion 25*e* and the second projection portion 25*f* is set to be slightly larger than a width of the distal end portion 27*d*. In other words, a clearance is formed between the distal end portion 27*d* and each of one pair of the first projection portion 25*e* and the second projection portion 25*f* in a state in which the distal end portion 27*d* is arranged between the one pair of the first projection portion 25*e* and the second projection portion 25*f*.

Figure 4:
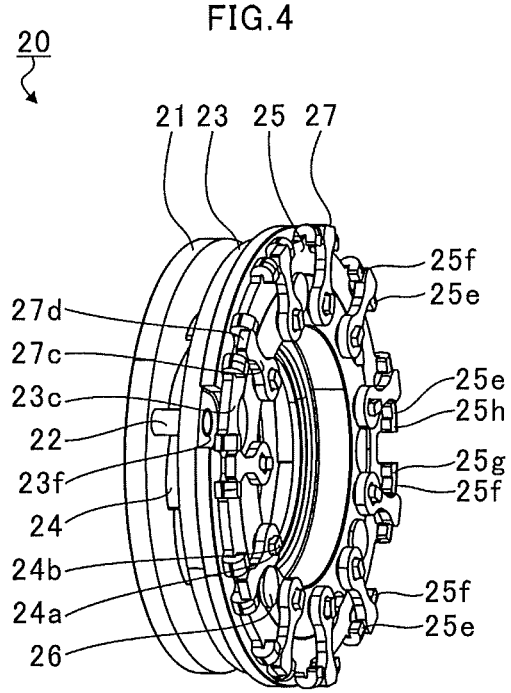
FIG. 4 is a perspective view for illustrating a state after the nozzle drive mechanism is assembled.

FIG. 4 is a perspective view for illustrating a state after the nozzle drive mechanism 20 is assembled. As described before, the pins 22 are inserted into the plate pin holes 21*b* (see FIG. 2) and the ring pin holes 23*f*. Both of the ends of the pins 22 are caulked, and the plate 21, the pins 22, and the nozzle ring 23 are consequently assembled to one another. The drive hole 25*a* (inner peripheral surface) of the drive ring 25 and the cylindrical portion 23*c* (outer peripheral surface) of the nozzle ring 23 are faced to one another in the radial direction. The drive ring 25 is held by the nozzle ring 23 so as to be rotatable. An axial movement of the drive ring 25 is restricted by the guide pins 26. That is, the guide pins 26 can serve to prevent axial detachment of the drive ring 25. The nozzle vanes 24 are positioned in the clearance (namely, the flow passage "x") between the plate 21 and the nozzle ring 23. The shaft portions 24*a* are axially supported by the shaft holes 23j of the nozzle ring 23. The link plate 27 is mounted to the distal end portion 24b of the shaft portion 24a.

In this state, a drive link plate (not shown) is arranged between the third projection portion 25g and the fourth projection portion 25h of the drive ring 25. The drive rink plate is a plate-shaped member having substantially the same external shape as that of the link plate 27. A distal end portion of the drive link plate is arranged between the third projection portion 25g and the fourth projection portion 25h similarly to the link plate 27. A drive shaft is inserted into a base end portion of the drive link plate. The base end portion of the drive link plate is positioned on the radially inner side of the drive ring 25 with respect to the distal end portion. The drive link plate is rotated through reception of power of an actuator (not shown) through intermediation of the drive shaft. Then, the distal end portion of the drive link plate is brought into abutment against the third projection portion 25g and the fourth projection portion 25h to press the third projection portion 25g and the fourth projection portion 25h. That is, a force in the circumferential direction is transmitted to the drive ring 25 including the third projection portion 25g and the fourth projection portion 25h. In such a manner, the power of the actuator is transmitted to the drive ring 25 (the third projection portion 25g and the fourth projection portion 25h). As a result, the drive ring 25 rotates (slides) while being supported by the cylindrical portion 23c of the nozzle ring 23.

As describe before, the distal end portion 27d of the link plate 27 is arranged between one pair of the first projection portion 25e and the second projection portion 25f of the drive ring 25. Therefore, when the drive ring 25 rotates, the distal end portion 27d is brought into abutment against the first projection portion 25e or the second projection portion 25f. The distal end portion 27d is pressed in the rotation direction. Then, the link plates 27 rotate (swing) about an axial center of the shaft portions 24a. As a result, the shaft portions 24a mounted to the link plates 27 rotate. In such a manner, the plurality of nozzle vanes 24 integrally rotate together with the shaft portions 24a. The flow passage width of the flow passage "x" thus changes.

Figure 5A:
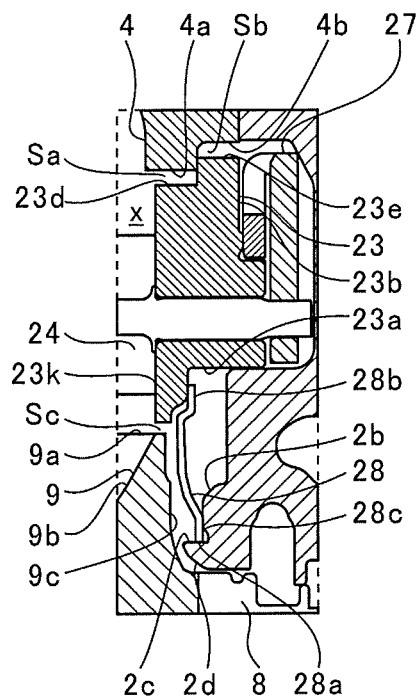
FIG. 5A is an extraction view for illustrating a broken-line portion of FIG. 1.
Figure 5B:
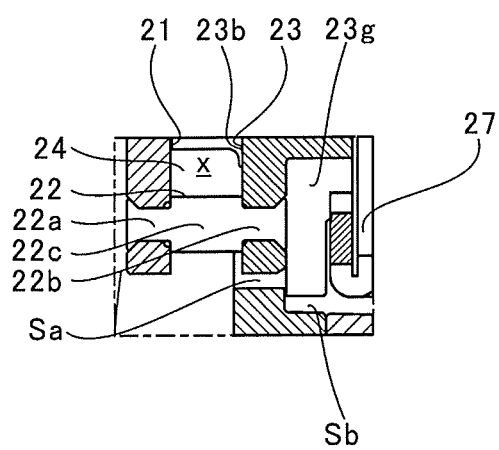
FIG. 5B is an extraction view for illustrating a one-dot chain line portion of FIG. 1.

In FIG. 5A, illustration is given of a broken-line portion of FIG. 1. In FIG. 5B, illustration is given of a one-dot chain line portion of FIG. 1. As illustrated in FIG. 5A, at least a part of the main body 23b of the nozzle ring 23 is positioned inside the turbine housing 4. A projecting wall portion 4a is formed on the turbine housing 4. The projecting wall portion 4a projects toward the inner side in the radial direction of the shaft 8. The main body 23b of the nozzle ring 23 has the outer peripheral surface 23d which is formed on a left side (nozzle vane 24 side) in FIG. 5A with respect to the projecting portion 23e. The outer peripheral surface 23d is smaller in diameter than the projecting portion 23e. A clearance Sa is formed between the projecting wall portion 4a and the outer peripheral surface 23d.

The projecting portion 23e is held in abutment against the projecting wall portion 4a from a link plate 27 side (bearing housing 2 side). The wall portion 4b is a portion of the turbine housing 4 which is positioned on the radially outer side of the projecting portion 23e. A clearance Sb is formed between the wall portion 4b and the outer peripheral surface of the projecting portion 23e.

Moreover, a shaft hole projection 23k is formed on the inner peripheral surface of the ring hole 23a of the nozzle ring 23. The shaft hole projection 23k projects radially inward. The shaft hole projection 23k is positioned on a left side (the nozzle vane 24 side) of FIG. 5A of the inner peripheral surface of the ring hole 23a. The shaft hole projection 23k is positioned on the radially outer side with respect to the impeller main body 9b on which the blades 9a are provided so as to stand. A clearance Sc is defined between the shaft hole projection 23k and the impeller main body 9b.

A wall portion 2b is a portion of the bearing housing 2 which is positioned on a back surface 9c side of the impeller main body 9b. The annular projection 2c projects on the back surface 9c side. A housing hole 2d is opened in the annular projection 2c. The shaft 8 is inserted into the housing hole 2d.

A plate spring 28 is an annular member. An insertion hole 28a is formed in the plate spring 28. The annular projection 2c (shaft 8) is inserted into the insertion hole 28a. The plate spring 28 is arranged between the back surface 9c of the turbine impeller 9 and the wall portion 2b of the bearing housing 2.

An outer contact portion 28b of the plate spring 28 on a radially outer side is brought into contact with the shaft hole projection 23k of the nozzle ring 23 from the link plate 27 side. Moreover, an inner contact portion 28c of the plate spring 28 on the radially inner side with respect to the outer contact portion 28b is brought into contact with the wall portion 2b of the bearing housing 2 from a turbine impeller 9 side. The plate spring 28 is supported by the bearing housing 2 through the inner contact portion 28c. For example, the inner contact portion 28c of the plate spring 28 is fitted to an outer peripheral portion of the annular projection 2c.

The plate spring 28 is configured to apply an elastic force to the nozzle ring 23 from the outer contact portion 28b. The plate spring 28 is configured to press the nozzle ring 23 to the left side in FIG. 5A (a direction from the link plates 27 to the nozzle vanes 24).

Moreover, the outer contact portion 28b is pressed against the shaft hole projection 23k. The inner contact portion 28c is pressed against the wall portion 2b. In such a manner, the plate spring 28 seals both of the contact portions. The plate spring 28 also provides a heat shielding function of suppressing transfer of heat of the exhaust gas to a radial bearing 7 side.

The projecting portion 23e of the nozzle ring 23 is pressed against the projecting wall portion 4a of the turbine housing 4 by the plate spring 28. As a result, the nozzle ring 23 is positioned (held) inside the bearing housing 2 and the turbine housing 4.

Moreover, the pressure becomes high on a flow passage "x" side through the exhaust gas. When a pressure on a link plate 27 side is excessively low, a difference between a pressure acting on the nozzle vanes 24 from the left side in FIG. 5A and a pressure acting on the shaft portions 24a from the right side becomes large. The nozzle vanes 24 are pressed toward the right side (link plate 27 side). As a result, a gap between the nozzle vanes 24 and the plate 21 becomes large. The function of the nozzle vanes 24 may consequently be impaired.

As illustrated in FIG. 5A, the clearances Sa and Sb do not communicate with one another at a location at which a projecting portion 23e of the nozzle ring 23 and a projecting wall portion 4a of the turbine housing 4 are in abutment against one another. That is, even when the pressure difference exists, the exhaust gas does not flow therethrough. Thus, as illustrated in FIG. 5B, the counter bore grooves 23g are formed in the nozzle ring 23.

Figure 6:
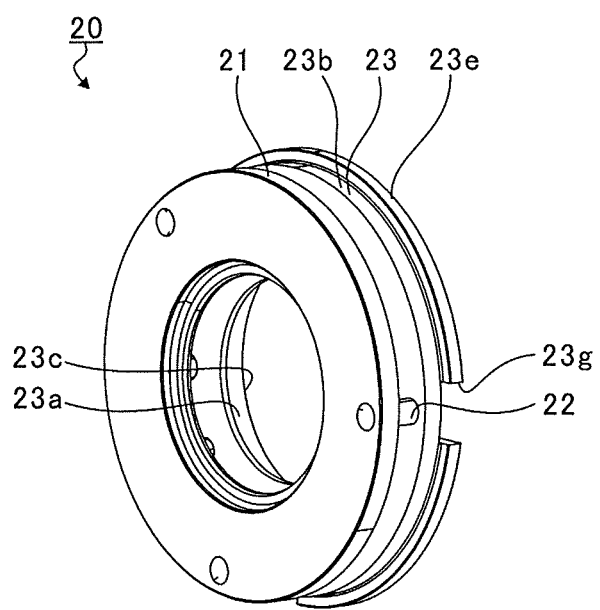
FIG. 6 is an explanatory view for illustrating a counter bore groove.

FIG. 6 is an explanatory view for illustrating the counter bore grooves 23g. In FIG. 6, the plate 21, the pins 22, and the nozzle ring 23 of the nozzle drive mechanism 20 are extracted and illustrated. As illustrated in FIG. 6, the counter bore grooves 23g of the nozzle ring 23 are formed on the cylindrical portion 23c side of the main body 23b. The ring pin hole 23f is opened in the counter bore groove 23g. The pins 22 are inserted into the ring pin holes 23f. Parts of the projecting portion 23e are cut out by the counter bore grooves 23g.

Therefore, as illustrated in FIG. 5B, both of the clearances Sa and Sb communicate with one another. The exhaust gas flows in from the flow passage "x" to the link plate 27 side. As a result, the pressure difference between the flow passage "x" side and the link plate 27 side decreases. The pressing force of the nozzle vanes 24 to the link plate 27 side is thus suppressed.

Moreover, a thickness of a portion of the main body 23b of the nozzle ring 23 through which the ring pin holes 23f pass is approximately equal to a thickness of the plate 21 as a result of the formation of the counter bore grooves 23g. In such a manner, axial lengths of both of the end portions 22a and 22b of the pin 22 smaller in diameter than the large-diameter portion 22c are formed to be equal to one another. Therefore, even when directions of the both end portions 22a and 22b of the pin 22 are inverted, the pin 22 can be inserted into the plate 21 and the nozzle ring 23. Consequently, a working efficiency increases.

Figure 7A:
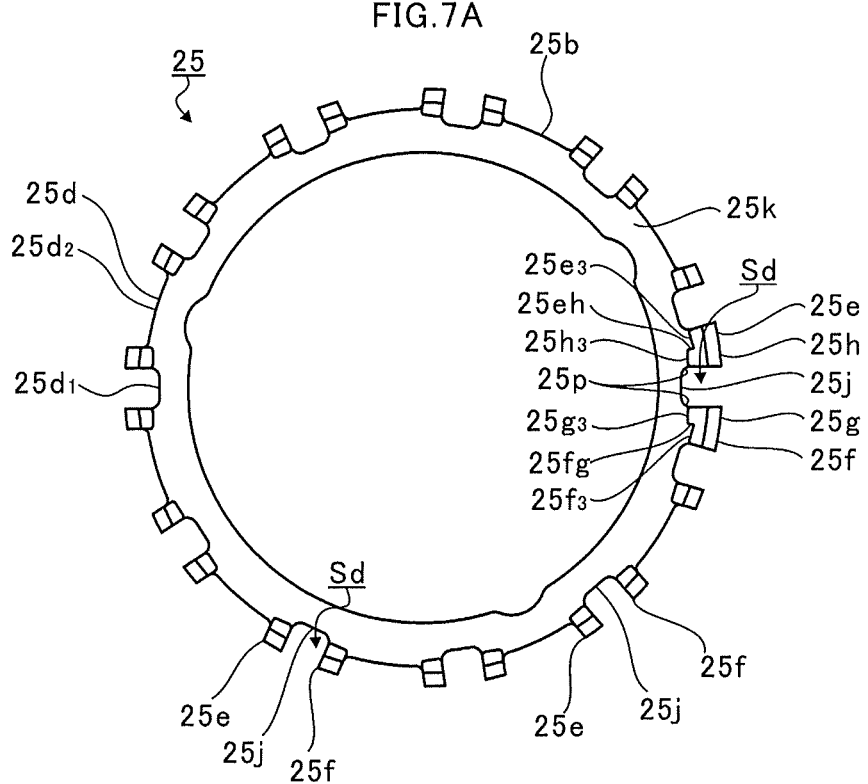
FIG. 7A is a front view of the drive ring.
Figure 7B:
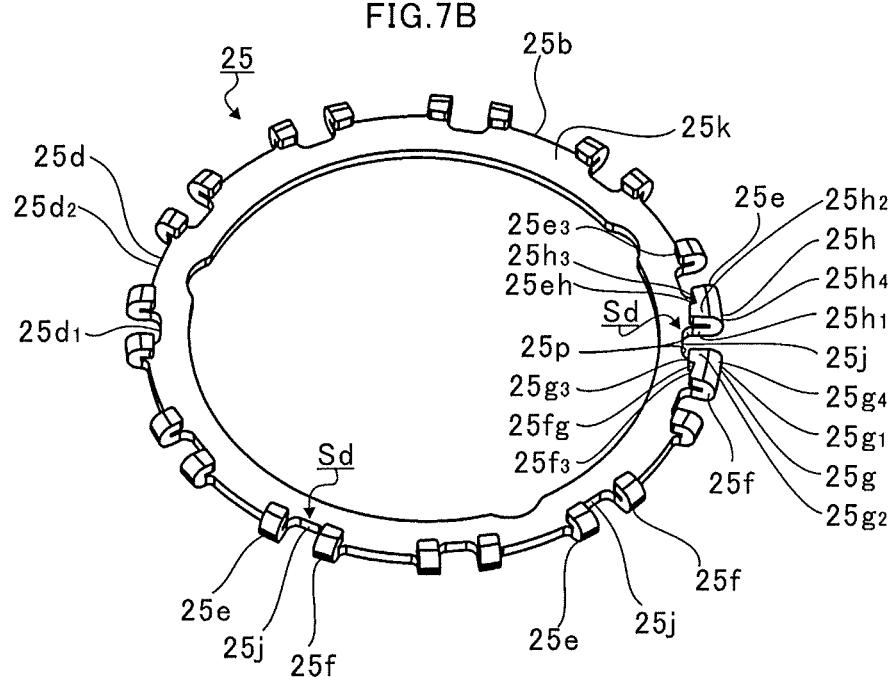
FIG. 7B is a perspective view of the drive ring.

FIG. 7A is a front view of the drive ring 25. FIG. 7B is a perspective view of the drive ring 25. As illustrated in FIG. 7A and FIG. 7B, a plurality of cutout portions 25j are formed in the main body portion 25b of the drive ring 25. The cutout portion 25j is positioned between one pair of the first projection portion 25e and the second projection portion 25f. That is, a clearance Sd is formed between the one pair of the first projection portion 25e and the second projection portion 25f. The clearance Sd passes through the main body portion 25b in the axial direction.

The third projection portion 25g is formed so as to continue to the second projection portion 25f in the circumferential direction of the main body portion 25b. Moreover, in this disclosure, the third projection portion 25g extends toward the radially inner side with respect to the second projection portion 25f. That is, a step surface 25fg is formed between the second projection portion 25f and the third projection portion 25g continuing to the second projection portion 25f. The step surface 25fg extends in the radial direction. Similarly, the fourth projection portion 25h is formed so as to continue to the first projection portion 25e in the circumferential direction of the main body portion 25b. Moreover, in this disclosure, the fourth projection portion 25h extends toward the radially inner side with respect to the first projection portion 25e. That is, a step surface 25eh is formed between the first projection portion 25e and the fourth projection portion 25h continuing to the first projection portion 25e. The step surface 25ef extends in the radial direction. In the foregoing, description is made of the case in which the third projection portion 25g and the second projection portion 25f are formed so as to continue to one another, and the fourth projection portion 25h and the first projection portion 25e are formed so as to continue to one another. However, a cutout may be formed between the third projection portion 25g and the second projection portion 25f. Moreover, a cutout may be formed between the fourth projection portion 25h and the first projection portion 25e.

Moreover, the cutout portion 25j is also formed between the third projection portion 25g and the fourth projection portion 25h. The clearance Sd is formed between the third projection portion 25g and the fourth projection portion 25h. The clearance Sd passes through the main body portion 25b in the axial direction.

Figure 8:
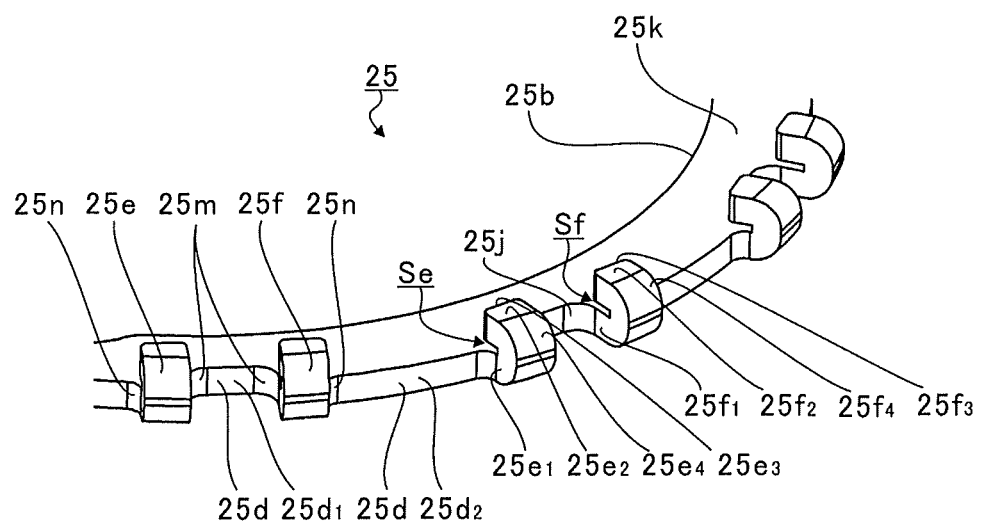
FIG. 8 is a partially enlarged view of the drive ring.

FIG. 8 is a partially enlarged view of the drive ring 25. As illustrated in FIG. 8, a base end portion $25e_1$ of the first projection portion 25e projects radially outward from the outer peripheral surface 25d of the drive ring $25_1$ Moreover, a distal end portion $25e_2$ of the first projection portion 25e is positioned on an upper side in FIG. 8 with respect to an end surface 25k of the main body portion 25b of the drive ring 25 on the upper side (link plate 27 side) of FIG. 8. A distal end surface $25e_3$ of the distal end portion $25e_2$ faces the radially inner side of the main body portion 25b. The distal end surface $25e_3$ is positioned on the radially inner side of the main body portion 25b with respect to the outer peripheral surface 25d (second outer peripheral surface $25d_2$ described later).

Moreover, the first projection portion 25e has a bent portion $25e_4$. The bent portion $25e_4$ is positioned between the base end portion $25e_1$ and the distal end portion $25e_2$. The bent portion $25e_4$ bends from the base end portion $25e_1$ toward an upper side in FIG. 8 (the link plate 27 side in a center axis direction (an axial direction of the shaft 8) of the main body portion 25b of the drive ring 25, the bearing housing 2 side in the thickness direction of the drive ring 25, and the side apart from the nozzle ring 23). The bent portion $25e_4$ bends to the distal end portion $25e_2$ toward the radially inner side of the main body portion 25b.

The base end portion $25e_1$ and the distal end portion $25e_2$ are arranged apart from one another in the axial direction. A clearance Se is formed between the base end portion $25e_1$ and the distal end portion $25e_2$. The base end portions $25e_1$ are formed on the outer periphery of the main body portion 25b of the drive ring 25. The base end portion $25e_1$ projects in the radial direction. The distal end portion $25e_2$ overlaps the base end portion $25e_1$ in the axial direction. The base end portion $25e_1$ and the distal end portion $25e_2$ are connected to one another by the bent portion $25e_4$.

Similarly, a base end portion $25f_1$ of the second projection portion 25f projects radially outward from the outer peripheral surface 25d of the drive ring 25. A distal end portion $25f_2$ of the second projection portion 25f is positioned on the upper side in FIG. 8 with respect to the end surface 25k of the main body portion 25b of the drive ring 25. A distal end surface $25f_3$ of the distal end portion $25f_2$ faces the radially inner side of the main body portion 25b.

Moreover, the second projection portion 25f has a bent portion $25f_4$. The bent portion $25f_4$ is positioned between the base end portion $25f_1$ and the distal end portion 25f2. The bent portion $25f_4$ bends from the base end portion $25f_1$ toward the upper side in FIG. 8 (the link plate 27 side in the center axis direction (the axial direction of the shaft 8) of the main body portion 25b of the drive ring 25). The bent portion $25f_4$ bends to the distal end portion $25f_2$ toward the radially inner side of the main body portion 25b.

The base end portion $25f_1$ and the distal end portion $25f_2$ are arranged apart from one another in the axial direction. That is, a clearance Sf is formed between the base end portion $25f_1$ and the distal end portion $25f_2$.

Moreover, a portion of the outer peripheral surface 25d of the drive ring 25 which is positioned between the one pair of the first projection portion 25e and the second projection portion 25f is referred to as "first outer peripheral surface $25d_1$". Moreover, portions of the outer peripheral surface 25d of the drive ring 25 positioned outside the one pair of the first projection portion 25e and the second projection portion 25f are each referred to as "second outer peripheral surface $25d_2$". The first outer peripheral surface $25d_1$ is positioned on the radially inner side of the main body portion $25b$ with respect to the second outer peripheral surface $25d_2$. That is, the cutout portion $25j$ extends toward the radially inner side of the main body portion $25b$ with respect to the second outer peripheral surface $25d_2$.

A first connection portion $25m$ is a portion connecting each of the base end portion $25e_1$ of the first projection portion $25e$ and the base end portion $25f_1$ of the second projection portion $25f$ and the first outer peripheral surface $25d_1$ to one another. The first connection portion $25m$ has a curved surface shape. The curvature center of the first connection portion $25m$ is positioned on the side apart from the main body portion $25b$ (radially outer side) with respect to the first outer peripheral surface $25d_1$ in a section including the first outer peripheral surface $25d_1$ and being orthogonal to the axial direction. The first connection portion $25m$ rises radially outward from the first outer peripheral surface $25d_1$ in the section including the first outer peripheral surface $25d_1$ and being orthogonal to the axial direction.

A second connection portion $25n$ is a portion connecting each of the base end portion $25e_1$ of the first projection portion $25e$ and the base end portion $25f_1$ of the second projection portion $25f$ and the second outer peripheral surface $25d_2$ to one another. The second connection portion $25n$ has a curved surface shape. The curvature center of the second connection portion $25n$ is positioned on the side apart from the main body portion $25b$ (radially outer side) with respect to the second outer peripheral surface $25d_2$ in a section including the second outer peripheral surface $25d_2$ and being orthogonal to the axial direction. The second connection portion $25n$ rises radially outward from the second outer peripheral surface $25d_2$ in the section including the second outer peripheral surface $25d_2$ and being orthogonal to the axial direction.

Moreover, as illustrated in FIG. 7A and FIG. 7B, the third projection portion $25g$ and the fourth projection portion $25h$ each have the same shape as those of the first projection portion $25e$ and the second projection portion $25f$. That is, the third projection portion $25g$ has a base end portion $25g_1$, a distal end portion $25g_2$, a distal end surface $25g_3$, and a bent portion $25g_4$ similarly to the first projection portion $25e$ and the second projection portion $25f$. The fourth projection portion $25h$ has a base end portion $25h_1$, a distal end portion $25h_2$, a distal end surface $25h_3$, and a bent portion $25h_4$ similarly to the first projection portion $25e$ and the second projection portion $25f$.

The distal end surface $25g_3$ of the third projection portion $25g$ and the distal end surface $25h_3$ of the fourth projection portion $25h$ are positioned on the radially inner side with respect to the distal end surfaces $25e_3$ and $25f_3$ of the first projection portion $25e$ and the second projection portion $25f$.

Moreover, a third connection portion $25p$ is a portion connecting each of the base end portion $25g_1$ of the third projection portion $25g$ and the base end portion $25h_1$ of the fourth projection portion $25h$ and the second outer peripheral surface $25d_2$ to one another. The third connection portion $25p$ has a curved surface shape.

Figure 9A:
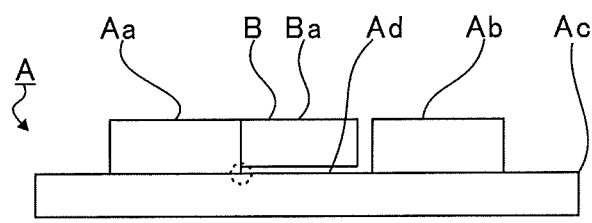
FIG. 9A is a view for illustrating a first projection portion and a second projection portion of a drive ring of a comparative example as viewed from a radially outer side of a main body portion.
Figure 9B:
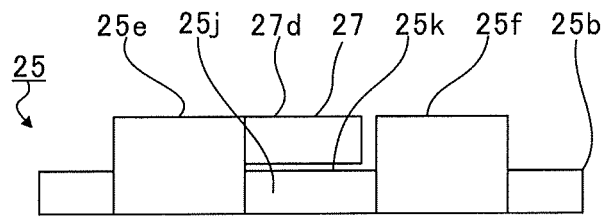
FIG. 9B is a view for illustrating a first projection portion and a second projection portion of the drive ring in the embodiment as viewed from the radially outer side of a main body portion.

FIG. 9A is a view for illustrating a first projection portion Aa and a second projection portion Ab of a drive ring A of a comparative example as viewed from a radially outer side of a main body portion Ac. FIG. 9B is a view for illustrating the first projection portion $25e$ and the second projection portion $25f$ of the drive ring 25 in this embodiment as viewed from the radially outer side of the main body portion $25b$.

As illustrated in FIG. 9A, the cutout portion $25j$ is not formed between the first projection portion Aa and the second projection portion Ab in the drive ring A of the comparative example. For example, when the first projection portion Aa presses a distal end portion Ba of a link plate B, stress concentration occurs at a boundary portion (indicated as a circle of a broken line in FIG. 9A) between the first projection portion Aa and an end surface Ad. Similarly, when the second projection portion Ab presses the distal end portion Ba of the link plate B, stress concentration occurs at a boundary portion between the second projection portion Ab and the end surface Ad.

As illustrated in 9B, the cutout portions $25j$ are formed in the drive ring 25 of this embodiment. Therefore, when the first projection portion $25e$ or the second projection portion $25f$ presses the distal end portion $27d$ of the link plate 27, stress concentration can be alleviated.

Moreover, the cutout portion $25j$ is formed also between the third projection portion $25g$ and the fourth projection portion $25h$ similarly to the portion between the first projection portion $25e$ and the second projection portion $25f$. Stress concentration which may occur when the third projection portion $25g$ or the fourth projection portion $25h$ is pressed by the drive link plate can be alleviated.

Figure 10A:
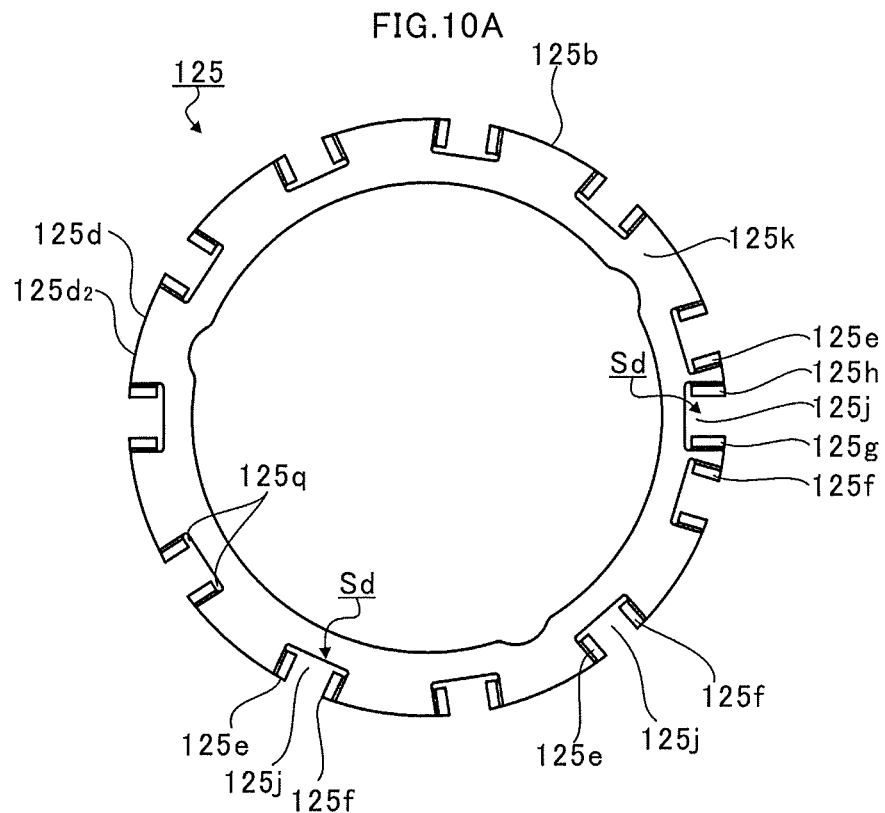
FIG. 10A is a front view of a drive ring of a first modification example.
Figure 10B:
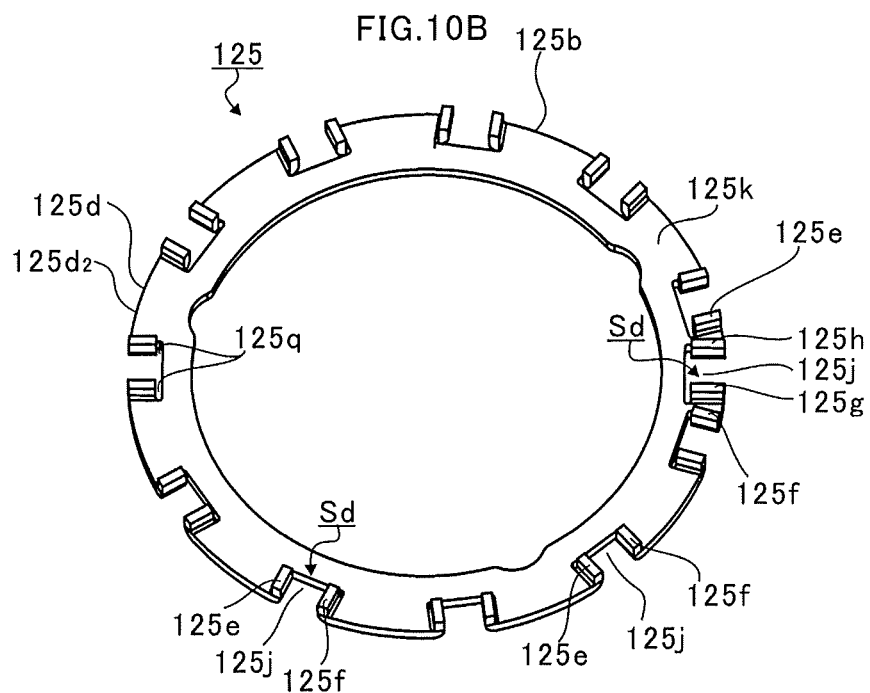
FIG. 10B is a perspective view of the drive ring of the first modification example.

FIG. 10A is a front view of a drive ring 125 of a first modification example. FIG. 10B is a perspective view of the drive ring 125 of the first modification example. As illustrated in FIG. 10A and FIG. 10B, a plurality of cutout portions $125j$ are formed in a main body portion $125b$ of a drive ring 125 similarly to the above-mentioned embodiment. The cutout portion $125j$ is positioned between one pair of a first projection portion $125e$ and a second projection portion $125f$. That is, the clearance Sd is formed between the one pair of the first projection portion $125e$ and the second projection portion $125f$. The clearance Sd passes through the main body portion $125b$ in the axial direction.

A third projection portion $125g$ is formed so as to be apart from the second projection portion $125f$ in the circumferential direction of the main body portion $125b$. Similarly, a fourth projection portion $125h$ is formed so as to be apart from the first projection portion $125e$ in the circumferential direction of the main body portion $125b$. The third projection portion $125g$ and the fourth projection portion $125h$ extend toward the radially inner side of the main body portion $125b$ with respect to the first projection portion $125e$ and the second projection portion $125f$. Moreover, the cutout portion $125j$ is formed between the third projection portion $125g$ and the fourth projection portion $125h$ similarly to the portion between the first projection portion $125e$ and the second projection portion $125f$. That is, the clearance Sd is formed between the third projection portion $125g$ and the fourth projection portion $125h$ similarly to the portion between one pair of the first projection portion $125e$ and the second projection portion $125f$. The clearance Sd passes through the main body portion $125b$ in the axial direction.

Moreover, slit portions $125q$ are formed in the main body portion $125b$. The slit portion $125q$ is positioned on the radially inner side of each of one pair of the first projection portion $125e$ and the second projection portion $125f$. The slit portion $125q$ passes through the main body portion $125b$ in the axial direction. Moreover, similarly, the slit portion $125q$ is formed on the radially inner side of each of the third projection portion $125g$ and the fourth projection portion $125h$ of the main body portion $125b$. These slit portions $125q$ are formed so as to continue to (open on) the cutout portions $125j$. For example, the clearance Sd may be a space formed of the cutout portion $125j$ and the slit portions $125q$.

In this configuration, for example, a step or the like may be formed at a boundary portion between an inner wall surface of the cutout portion 125*j* and an inner wall surface of the slit portion 125*q*. The boundary portion between the inner wall surface of the cutout portion 125*j* and the inner wall surface of the slit portion 125*q* may be a continuous flat surface.

Figure 11:
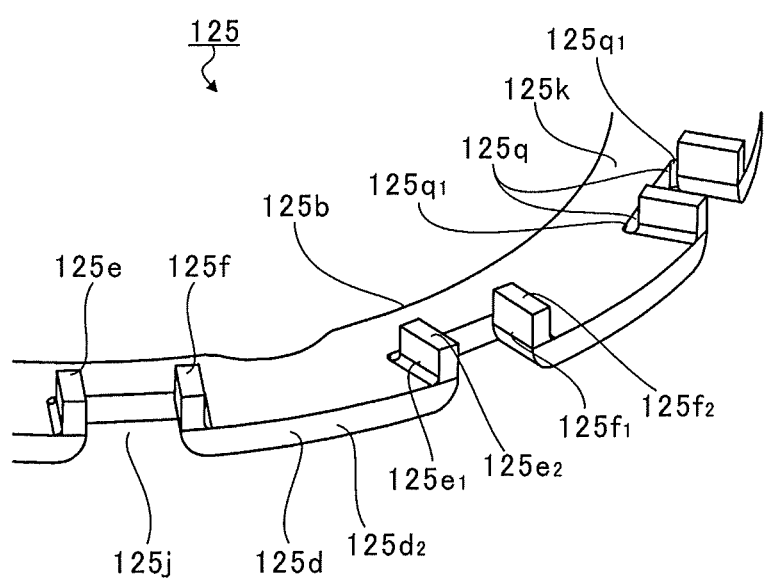
FIG. 11 is a partially enlarged view of the drive ring of the first modification example.

FIG. 11 is a partially enlarged view of the drive ring 125 of the first modification example. As illustrated in FIG. 11, a base end portion 125$e_1$ of the first projection portion 125*e* bends from the main body portion 125*b*. A distal end portion 125$e_2$ of the first projection portion 125*e* projects toward an upper side in FIG. 11 (the link plate 27 side in the center axis direction (the axial direction of the shaft 8) of the main body portion 125*b* of the drive ring 125, the bearing housing 2 side in the thickness direction of the drive ring 125, and the side apart from the nozzle ring 23) with respect to an end surface 125*k*. Similarly, the base end portion 125$f_1$ of the second projection portion 125*f* bends from the main body portion 125*b*. A distal end portion 125$f_2$ of the second projection portion 125*f* projects toward the upper side in FIG. 11 with respect to the end surface 125*k*.

Connection portions between the first projection portion 125*e* and the main body portion 125*b* each have a curved surface shape on both of an end surface 125*k* side and a cutout portion 125*j* side. Similarly, connection portions between the second projection portion 125*f* and the main body portion 125*b* each have a curved surface shape on both of the end surface 125*k* side and the cutout portion 125*j* side. Moreover, each of end portions 125$q_1$ of the slit portion 125*q* in the circumferential direction of the main body portion 125*b* has a curved surface shape. The curvature center of the end portion 125$q_1$ of the slit portion 125*q* is positioned on the side apart from the drive ring 125 with respect to the end portion 125$q_1$.

In this configuration, the end portion 125$q_1$ can also be described as below. That is, in FIG. 10A, a value of an angle between a connection line (reference line) connecting a center position of the main body portion 125*b* in the radial direction and a center position of the slit portion 125*q* in the circumferential direction to one another and a connection line connecting the center position of the main body portion 125*b* in the radial direction and a freely selected position of the slit portion 125*q* in the circumferential direction is defined as an angle value. For example, the angle value is indicated as a positive value in the clockwise direction of FIG. 10A, and is indicated as a negative value in the counterclockwise direction. In this configuration, the end portions 125$q_1$ are at a position having a maximum (maximal) angle value and a position having a minimum (minimal) angle value.

Moreover, as illustrated in FIG. 10A, the end portion 125$q_1$ has an arc shape having a central angle of 90 degrees in front view of the drive ring 125. However, the central angle of the arc shape of the end portion 125$q_1$ may be equal to or more than 90 degrees, or less than 90 degrees. Moreover, an inner wall surface having a straight line shape extending radially inward from the inner wall surface having the arc shape may be formed in the end portion 125$q_1$. In this case, a second inner wall surface having an arc shape may be formed at a portion between the inner wall surface having the straight line shape and each of the first projection portion 125*e* and the second projection portion 125*f* in the radial direction. The center of the curvature of the second inner wall surface having the arc shape is positioned on the center side of the slit portion 125*q* in the circumferential direction with respect to the second inner wall surface having the arc shape. As described above, when at least the inner wall surfaces of the connection portions of the end portion 125$q_1$ connected to the first projection portion 125*e* and the second projection portion 125*f* each have the arc shape in front view of the drive ring 125, the stress concentration can be alleviated.

Moreover, although detailed illustration is omitted, the third projection portion 125*g* and the fourth projection portion 125*h* also have shapes similar to those of the first projection portion 125*e* and the second projection portion 125*f*. That is, a base end portion of the third projection portion 125*g* bends from the main body portion 125*b*. A distal end portion of the third projection portion 125*g* projects toward the link plate 27 side (the bearing housing 2 side in the thickness direction of the drive ring 125, and the side apart from the nozzle ring 23) in the center axis direction (the axial direction of the shaft 8) of the main body portion 125*b* of the drive ring 125 with respect to the end surface 125*k*. Similarly, a base end portion of the fourth projection portion 125*h* bends from the main body portion 125*b*. A distal end portion of the fourth projection portion 125*h* projects toward the link plate 27 side (the bearing housing 2 side in the thickness direction of the drive ring 125, and the side apart from the nozzle ring 23) in the center axis direction (the axial direction of the shaft 8) of the main body portion 125*b* of the drive ring 125 with respect to the end surface 125*k* (see FIG. 10B).

Also in the first modification example, the cutout portions 125*j* are formed in the main body portion 125*b* similarly to the above-mentioned embodiment. Therefore, when the first projection portion 125*e* or the second projection portion 125*f* presses the distal end portion 27*d* of the link plate 27, the stress concentration can be alleviated. Similarly, the stress concentration which may occur when the third projection portion 125*g* or the fourth projection portion 125*h* is pressed by the drive link plate can be alleviated.

FIG. 12A is a front view of a drive ring 225 of a second modification example. FIG. 12B is a perspective view of the drive ring of the second modification example. As illustrated in FIG. 12A and FIG. 12B, a plurality of cutout portions 225*j* are formed in a main body portion 225*b* of the drive ring 225 similarly to the above-mentioned embodiment and the first modification example. The cutout portion 225*j* is positioned between one pair of a first projection portion 225*e* and a second projection portion 225*f*. That is, the clearance Sd is formed between the one pair of the first projection portion 225*e* and the second projection portion 225*f*. The clearance Sd passes through the main body portion 225*b* in the axial direction.

The third projection portion 225*g* is formed so as to be apart from the second projection portion 225*f* in the circumferential direction of the main body portion 225*b*. Similarly, the fourth projection portion 225*h* is formed so as to be apart from the first projection portion 225*e* in the circumferential direction of the main body portion 225*b*. The third projection portion 225*g* and the fourth projection portion 225*h* extend toward the radially inner side of the main body portion 225*b* with respect to the first projection portion 225*e* and the second projection portion 225*f*. Moreover, the cutout portion 225*j* is formed also between the third projection portion 225*g* and the fourth projection portion 225*h* similarly to the portion between the first projection portion 225*e* and the second projection portion 225*f*.

Moreover, curved surface portions 225*q* are formed in the main body portion 225*b*. The curved surface portion 225*q* is positioned on an inner wall surface of the cutout portion 225*j* on a radially inner side of the main body portion 225*b*. Moreover, the curvature center of the curved surface portion 225q is positioned on a radially outer side of the main body portion 225b with respect to the curved surface portion 225q.

Figure 13A:
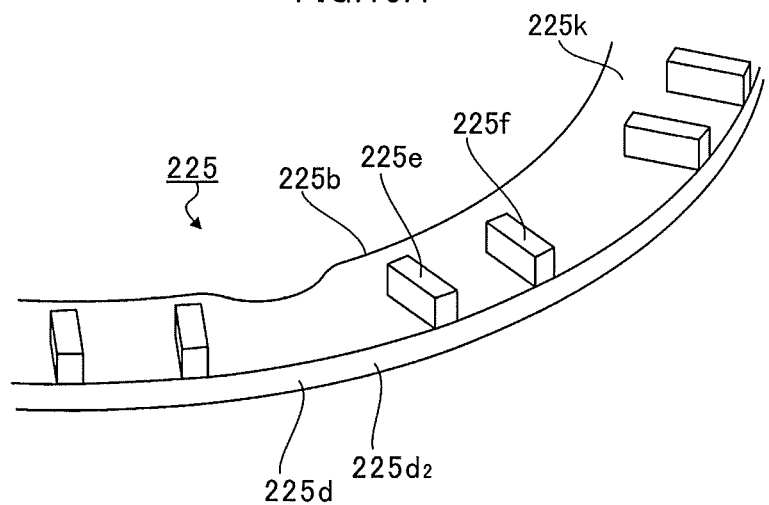
FIG. 13A is a partially enlarged view of the drive ring before cutout portions of the second modification example are formed.
Figure 13B:
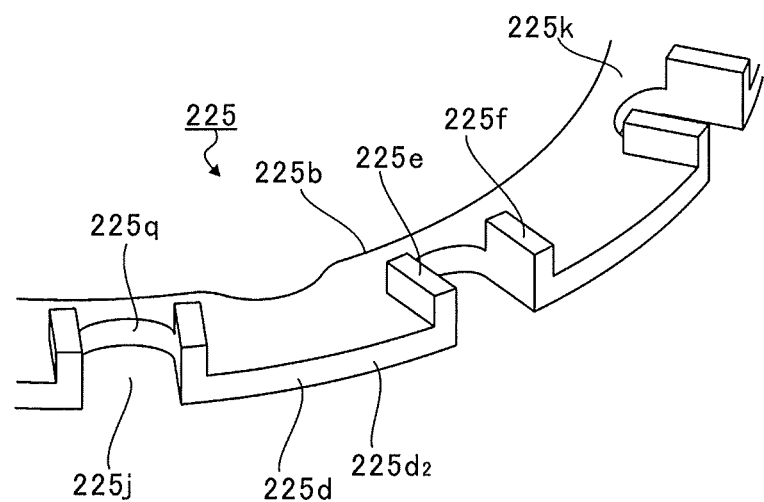
FIG. 13B is a partially enlarged view of the drive ring after the cutout portions of the second modification example are formed.

FIG. 13A is a partially enlarged view of the drive ring 225 before cutout portions 225j of the second modification example are formed. FIG. 13B is a partially enlarged view of the drive ring 225 after the cutout portions 225j of the second modification example are formed As illustrated in FIG. 13A, the main body portion 225b extends between the first projection portion 225e and the second projection portion 225f before the cutout portions 225j are formed. The main body portion 225b extends between the third projection portion 225g and the fourth projection portion 225h. In other words, the main body portion 225b has an annular shape. The plurality of first projection portions 225e and second projection portions 225f, the third projection portion 225g, and the fourth projection portion 225h are provided so as to be apart from one another in the circumferential direction, and stand in the axial direction while the main body portion 225b serves as a base portion. For example, the cutout portions 225j and the curved surface portions 225q are formed by applying machining such as cutting to the main body portion 225b having such a shape.

Also in the second modification example, the cutout portions 225j are formed in the main body portion 225b similarly to the above-mentioned embodiment and the first modification example. Therefore, when the first projection portion 225e or the second projection portion 225f presses the distal end portion 27d of the link plate 27, the stress concentration can be alleviated. Similarly, the stress concentration which may occur when the third projection portion 225g or the fourth projection portion 225h is pressed by the drive link plate can be alleviated. Moreover, in the second modification example, the curved surface portion 225q is formed on an inner wall surface of the cutout portion 225j. Therefore, the stress concentration is further alleviated.

One embodiment of the present disclosure has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

As in the above-mentioned embodiment, description is made of the case in which the first projection portion 25e and the second projection portion 25f project radially outward from the outer peripheral surface 25d of the drive ring 25. Description is made of the case in which the first projection portion 25e and the second projection portion 25f bend toward the link plate 27 side (the bearing housing 2 side in the thickness direction of the drive ring 25, and the side apart from the nozzle ring 23) in the center axis direction (the axial direction of the shaft 8) of the main body portion 25b of the drive ring 25. In this case, projecting heights of the first projection portions 25e and the second projection portions 25f toward the link plate 27 side (the bearing housing 2 side in the thickness direction of the drive ring 25, and the side apart from the nozzle ring 23) of the main body portion 25b of the drive ring 25 in the center axis direction (the axial direction of the shaft 8) can be designed through the clearances Se and Sf regardless of a plate thickness of the main body portion 25b in the axial direction. For example, the projecting heights of the first projection portion 25e and the second projection portion 25f can be secured so as to be larger than the plate thickness of the main body portion 25b in the axial direction. That is, large abutment areas of the first projection portion 25e and the second projection portion 25f against the link plate 27 can be secured regardless of the plate thickness. Therefore, strength against the load on the first projection portions 25e and the second projection portions 25f from the link plates 27 can be increased.

Moreover, the second outer peripheral surface $25d_2$ is positioned on the radially inner side of the main body portion 25b with respect to the first projection portions 25e and the second projection portions 25f. Therefore, the weight can be reduced compared with a case in which the second outer peripheral surface $25d_2$ extends to the radial positions which are the same as those of the first projection portions 25e and the second projection portions 25f. Moreover, also in the first modification example and the second modification example, similarly to the above-mentioned embodiment, the second outer peripheral surfaces $125d_2$ and $225d_2$ can be cut out so as to be on the radially inner side with respect to the first projection portions 125e and 225e and the second projection portions 125f and 225f.

Moreover, the first projection portions 25e and the second projection portions 25f of the above-mentioned embodiment can easily be formed, for example, through hemming. Thus, the cost can be reduced. In this case, when the clearances Se and Sf are increased, deformations of the abutment surfaces of the first projection portions 25e and the second projection portions 25f against the link plates 27 can be suppressed.

Moreover, in the above-mentioned embodiment, the first outer peripheral surfaces $25d_1$ of the drive ring 25 are positioned on the radially inner side with respect to the second outer peripheral surfaces $25d_2$. In this case, a large curvature radius of the first connection portion 25m can be secured, thereby alleviating the stress concentration. However, the first outer peripheral surfaces $25d_1$ may have the radial position which is the same as that of the second outer peripheral surfaces $25d_2$, or may be positioned on the radially outer side with respect to the second outer peripheral surfaces $25d_2$. Moreover, the first connection portions 25m are not essentially required. The base end portion $25e_1$ and the first outer peripheral surface $25d_1$ may directly be connected to one another. However, the stress concentration in the base end portion $25e_1$ on the first outer peripheral surface $25d_1$ side can be alleviated through forming the first connection portion 25m.

Moreover, the second outer peripheral surfaces $25d_2$ may be positioned on the radially inner side with respect to the positions illustrated in FIG. 7A, FIG. 7B, and FIG. 8. In this case, a large curvature radius of the second connection portion 25n can be secured, thereby alleviating the stress concentration. However, the second connection portions 25n are not essentially required. The base end portion $25e_1$ and the second outer peripheral surface $25d_2$ may directly be connected to one another. However, the stress concentration in the base end portion $25e_1$ on the second outer peripheral surface $25d_2$ side can be alleviated through forming the second connection portion 25n.

Moreover, in the first modification example, description is made of the case in which the slit portions 125q are formed. For example, when the first projection portions 125e and the second projection portions 125f are formed by pressing, stress concentration during the machining can be alleviated through slit portions 125q. Moreover, the cost of the drive ring 125 can be reduced through the pressing. However, the method of machining the drive ring 125 is not limited to the pressing, and may be, for example, forging. In this case, the slit portions 125q are not required. Moreover, in the cases of the pressing and the forging, the abutment surfaces of the first projection portions 125*e* and the second projection portions 125*f* against the link plates 27 can be formed at a high surface precision.

Moreover, in the second modification example, description is made of the case in which the curved surface portions 225*q* are formed on the inner wall surfaces of the cutout portions 225*j*. However, the curved surface portions 225*q* are not essentially required.

Moreover, in the above-mentioned embodiment, description is made of the case in which the distal end surfaces 25$g_3$ of the third projection portions 25*g* are positioned on the radially inner side with respect to the distal end portions 25$e_3$ and 25$f_3$ of the first projection portions 25*e* and the second projection portions 25*f*. Similarly, description is made of the case in which the distal end surfaces 25$h_3$ of the fourth projection portions 25*h* are positioned on the radially inner side with respect to the distal end portions 25$e_3$ and 25$f_3$ of the first projection portions 25*e* and the second projection portions 25*f*. Moreover, in the first modification example, description is made of the case in which the third projection portions 125*g* extend toward the radially inner side of the main body portion 125*b* with respect to the first projection portions 125*e* and the second projection portions 125*f*. Similarly, description is made of the case in which the fourth projection portions 125*h* extend toward the radially inner side of the main body portion 125*b* with respect to the first projection portions 125*e* and the second projection portions 125*f*. Moreover, in the second modification example, description is made of the case in which the third projection portions 225*g* extend toward the radially inner side of the main body portion 225*b* with respect to the first projection portions 225*e* and the second projection portions 225*f*. Similarly, description is made of the case in which the fourth projection portions 225*h* extend toward the radially inner side of the main body portion 225*b* with respect to the first projection portions 225*e* and the second projection portions 225*f*. In these cases, for example, even when a movable range of the drive link plate is large, disengagement between the third projection portions 25*g*, 125*g*, and 225*g* and the fourth projection portions 25*h*, 125*h*, and 225*h* and the drive link plate can be less likely occur.

However, the distal end surfaces 25$g_3$ of the third projection portions 25*g* may be at the radially same positions as, or may be positioned on the radially outer side with respect to the distal end surfaces 25$e_3$ and the 25$f_3$ of the first projection portions 25*e* and the second projection portions 25*f*. Similarly, the distal end surfaces 25$h_3$ of the fourth projection portions 25*h* may be at the radially same positions as, or may be positioned on the radially outer side with respect to the distal end surfaces 25$e_3$ and the 25$f_3$ of the first projection portions 25*e* and the second projection portions 25*f*. Moreover, the third projection portions 125*g* may extend in the radial direction to the same positions as those of the first projection portions 125*e* and the second projection portions 125*f*. Moreover, the first projection portions 125*e* and the second projection portions 125*f* may extend toward the radially inner side with respect to the third projection portions 125*g*. Similarly, the fourth projection portions 125*h* may extend in the radial direction to the same positions as those of the first projection portions 125*e* and the second projection portions 125*f*. Moreover, the first projection portions 125*e* and the second projection portions 125*f* may extend toward the radially inner side with respect to the fourth projection portions 125*h*. Moreover, the third projection portions 225*g* may extend in the radial direction to the same positions as those of the first projection portions 225*e* and the second projection portions 225*f*. Moreover, the first projection portions 225*e* and the second projection portions 225*f* may extend toward the radially inner side with respect to the third projection portions 225*g*. Similarly, the fourth projection portions 225*h* may extend in the radial direction to the same positions as those of the first projection portions 225*e* and the second projection portions 225*f*. Moreover, the first projection portions 225*e* and the second projection portions 225*f* may extend toward the radially inner side with respect to the fourth projection portions 225*h*.

INDUSTRIAL APPLICABILITY

The present disclose can be applied to a variable capacity turbocharger including link plates to which nozzle vanes are mounted.

What is claimed is:

1. A variable capacity turbocharger, comprising:
   a drive ring including a main body portion having an annular shape;
   a first projection portion and a second projection portion, which are formed on the main body portion, and are arranged apart from one another in a circumferential direction of the main body portion so as to sandwich a link plate to which a nozzle vane is mounted; and
   a cutout portion, which is formed in a portion of the main body portion between the first projection portion and the second projection portion,
   wherein the first projection portion and the second projection portion project radially outward from an outer peripheral surface of the drive ring, and bend toward a center axis direction of the drive ring.

2. The variable capacity turbocharger according to claim 1, further comprising a nozzle ring, which has a shaft hole configured to axially support a shaft portion connecting the nozzle vane and the link plate to one another, and is configured to support the main body portion of the drive ring.

3. The variable capacity turbocharger according to claim 1, wherein a first outer peripheral surface of the outer peripheral surface of the drive ring positioned between the first projection portion and the second projection portion is positioned on a radially inner side with respect to a second outer peripheral surface positioned outside the first projection portion and the second projection portion.

4. The variable capacity turbocharger according to claim 2, wherein a first outer peripheral surface of the outer peripheral surface of the drive ring positioned between the first projection portion and the second projection portion is positioned on a radially inner side with respect to a second outer peripheral surface positioned outside the first projection portion and the second projection portion.

5. The variable capacity turbocharger according to claim 3, further comprising a first connection portion, which includes a curved surface connecting a base end portion of each of the first projection portion and the second projection portion and the first outer peripheral surface to one another.

6. The variable capacity turbocharger according to claim 4, further comprising a first connection portion, which includes a curved surface connecting a base end portion of each of the first projection portion and the second projection portion and the first outer peripheral surface to one another.

7. The variable capacity turbocharger according to claim 5, further comprising a second connection portion, which includes a curved surface connecting the base end portion and the second outer peripheral surface to one another.

8. The variable capacity turbocharger according to claim 6, further comprising a second connection portion, which includes a curved surface connecting the base end portion and the second outer peripheral surface to one another.

* * * * *